(12) United States Patent
Denny et al.

(10) Patent No.: US 7,170,930 B2
(45) Date of Patent: Jan. 30, 2007

(54) RECEIVER

(75) Inventors: Paul A. Denny, Bristol (GB); Nicholas H. Weiner, Bristol (GB)

(73) Assignee: Phyworks Limited (GB)

( * ) Notice: Subject to any disclaimer, the term of this patent is extended or adjusted under 35 U.S.C. 154(b) by 766 days.

(21) Appl. No.: 10/376,890

(22) Filed: Feb. 27, 2003

(65) Prior Publication Data

US 2004/0146099 A1 Jul. 29, 2004

(30) Foreign Application Priority Data

Jan. 28, 2003 (GB) .................................. 0301953.6

(51) Int. Cl.
*H03H 7/30* (2006.01)
*H03H 7/40* (2006.01)
*H03H 5/159* (2006.01)

(52) U.S. Cl. ...................... 375/229; 375/238; 375/239; 375/242; 375/256; 375/286; 375/353; 375/257; 329/300; 329/304; 341/126; 455/130; 455/296

(58) Field of Classification Search ................ 375/229, 375/230, 232, 234, 316, 345, 350, 238, 239, 375/242, 256, 257, 286, 353; 708/321, 323; 370/295; 333/18; 329/300, 304; 341/126; 455/130, 296

See application file for complete search history.

(56) References Cited

U.S. PATENT DOCUMENTS

| 4,789,994 A | 12/1988 | Randall et al. ................ 375/12 |
| 5,495,501 A | 2/1996 | Iwamatsu et al. ........... 375/232 |
| 5,789,913 A | 8/1998 | Mager ..................... 324/76.79 |
| 2002/0080896 A1 | 6/2002 | Riess et al. ................. 375/341 |

*Primary Examiner*—Mohammed Ghayour
*Assistant Examiner*—Erin M. File
(74) *Attorney, Agent, or Firm*—Lahive & Cockfield, LLP

(57) ABSTRACT

A method of equalizer adaptation involves comparing equalizer output values with a center threshold, and with at least one of a pair of outer thresholds, and adapting the equalizer in order to increase the degree of eye opening.

The values of the outer thresholds are adapted such that a fixed proportion of equalizer output values lie between the outer thresholds, and the equalizer coefficients are adapted such the separation of the outer thresholds is increased. The equalizer coefficients are adapted on the basis of equalizer output values which lie between the pair of outer thresholds.

13 Claims, 3 Drawing Sheets

RECEIVER

TECHNICAL FIELD OF THE INVENTION

This invention relates to a receiver, and in particular to a receiver, which includes an equalizer to compensate for distortion introduced by a communications channel.

BACKGROUND OF THE INVENTION

In a conventional digital data transmission system, a sequence of data bits is transmitted over a communications medium. A receiver then attempts to recreate the transmitted sequence. That is, for each received bit, the receiver determines whether the transmitted bit is more likely to have been a "1" or a "0". In doing so, the receiver must deal with the fact that the received signal will not be a perfect copy of the transmitted bit sequence, but will show the effects of changes to the waveform introduced by the communications medium, and will include an additional noise component.

For many communications media, one source of changes to the waveform is inter-symbol-interference (ISI). That is, energy from one bit period is received in another bit period. In the case of optical fibres, ISI results from the fact that components of optical signals travel along an optical fibre at different speeds.

The presence of ISI greatly increases the probability that the receiver will fail to determine correctly whether a specific transmitted bit was a "1" or a "0". That is, it greatly increases the probability of bit errors.

It is known, however, that it is possible to compensate for ISI to some extent. A particular transmitted waveform results in a particular received waveform, and the relationship between the transmitted waveform and the received waveform can be expressed mathematically as a transfer function. An equalizer can be provided in the receiver, which applies a second transfer function to the received waveform. If the second transfer function can be made to approximate the inverse of the first transfer function, then the effects of ISI can be approximately compensated.

Equalizers are known in which the equalizer output is compared with a target waveform, and the equalizer transfer function is automatically adapted using the well-known LMS algorithm, so that the equalizer output becomes closer to the target waveform.

It is also known that the signals can be represented by "eye diagrams", which provide a way of showing the shapes of waveforms. Specifically, an eye diagram shows the shape of the waveform, during the course of a large number of bit periods, with the waveform shapes during the different bit periods being superimposed on each other. The waveform shape of a "1" in the signal should be very clearly different from the waveform shape of a "0" in the signal, leading to an open eye. However, in a distorted signal, the eye will appear more closed. The degree of eye opening therefore indicates the amount of distortion, although judgements about the degree of eye opening are generally qualitative rather than quantitative.

SUMMARY OF THE INVENTION

According to the present invention, there is provided a method of equalizer adaptation, in which equalizer output values are compared with a centre threshold, and with at least one of a pair of outer thresholds, and the equalizer is adapted in order to increase the degree of eye opening.

Specifically, the values of the outer thresholds are adapted such that a fixed proportion of equalizer output values lie between the outer thresholds, and the equalizer coefficients are adapted such the separation of the outer thresholds is increased.

More specifically, the equalizer coefficients are adapted on the basis of equalizer output values which lie between the pair of outer thresholds.

Preferably, a first outer threshold is adapted such that a first proportion of equalizer output values lies above the first outer threshold, and a second outer threshold is adapted such that a second proportion of equalizer output values lies above the second outer threshold. More preferably, the first proportion of equalizer output values lying above the first outer threshold is equal to a third proportion of equalizer output values lying below the second outer threshold.

Further, the centre threshold may be adapted such that it lies midway between the outer thresholds.

DETAILED DESCRIPTION OF PREFERRED EMBODIMENTS

Figure 1:
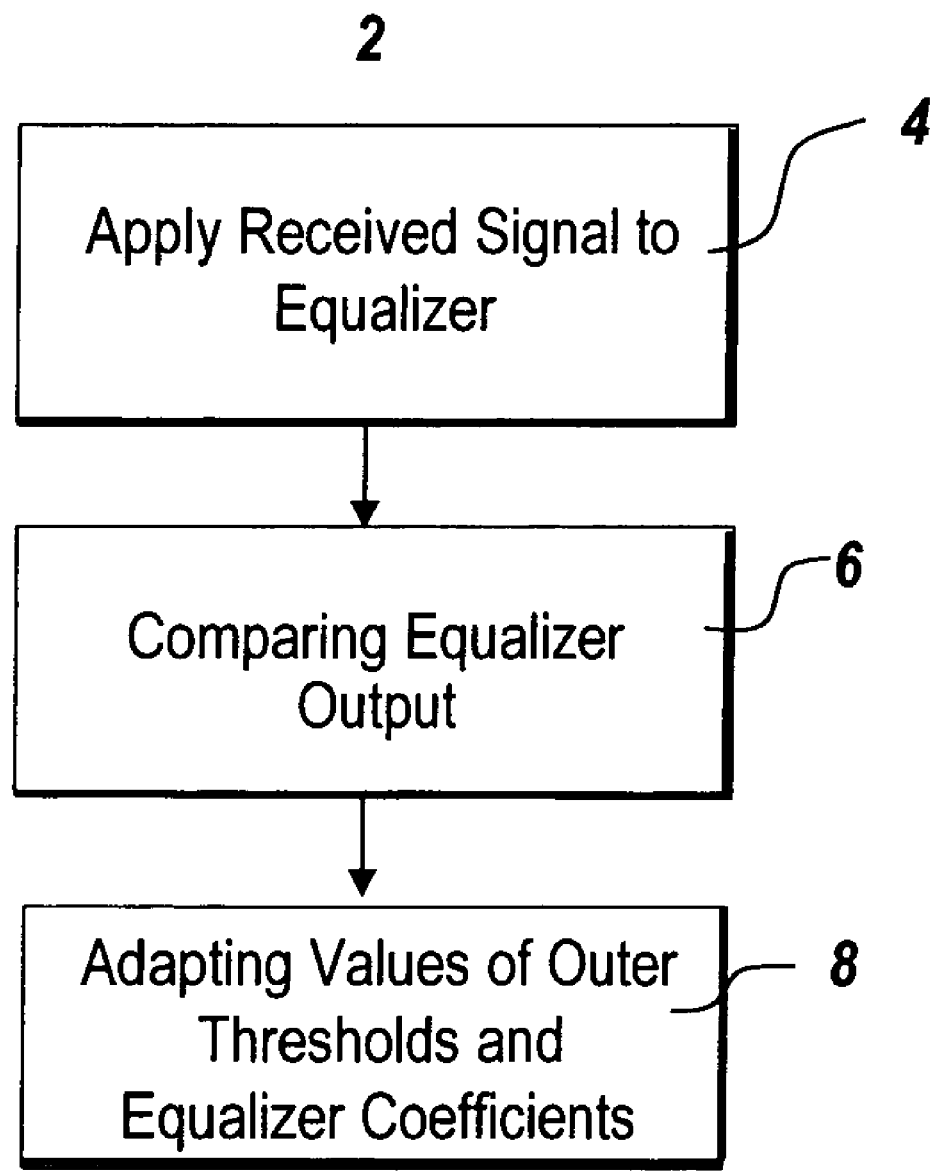
FIG. 1 is a flow chart diagram of a method in accordance with one aspect of present invention.

FIG. 1 shows a flowchart 2 of a method of the present invention. In this embodiment, the method comprises applying the received signal to an equalizer, the equalizer having equalizer coefficients, to obtain an equalizer output (step 4); comparing the equalizer output with a centre threshold, and with at least one of a pair of outer thresholds (step 6); and adapting the values of the outer thresholds such that a fixed proportion of equalizer output values lie between the pair of outer thresholds, and adapting the equalizer coefficients on the basis of equalizer output values which lie between the pair of outer thresholds, such that the separation of those equalizer output values from the centre threshold tends to be maximized (step 8).

Figure 2:
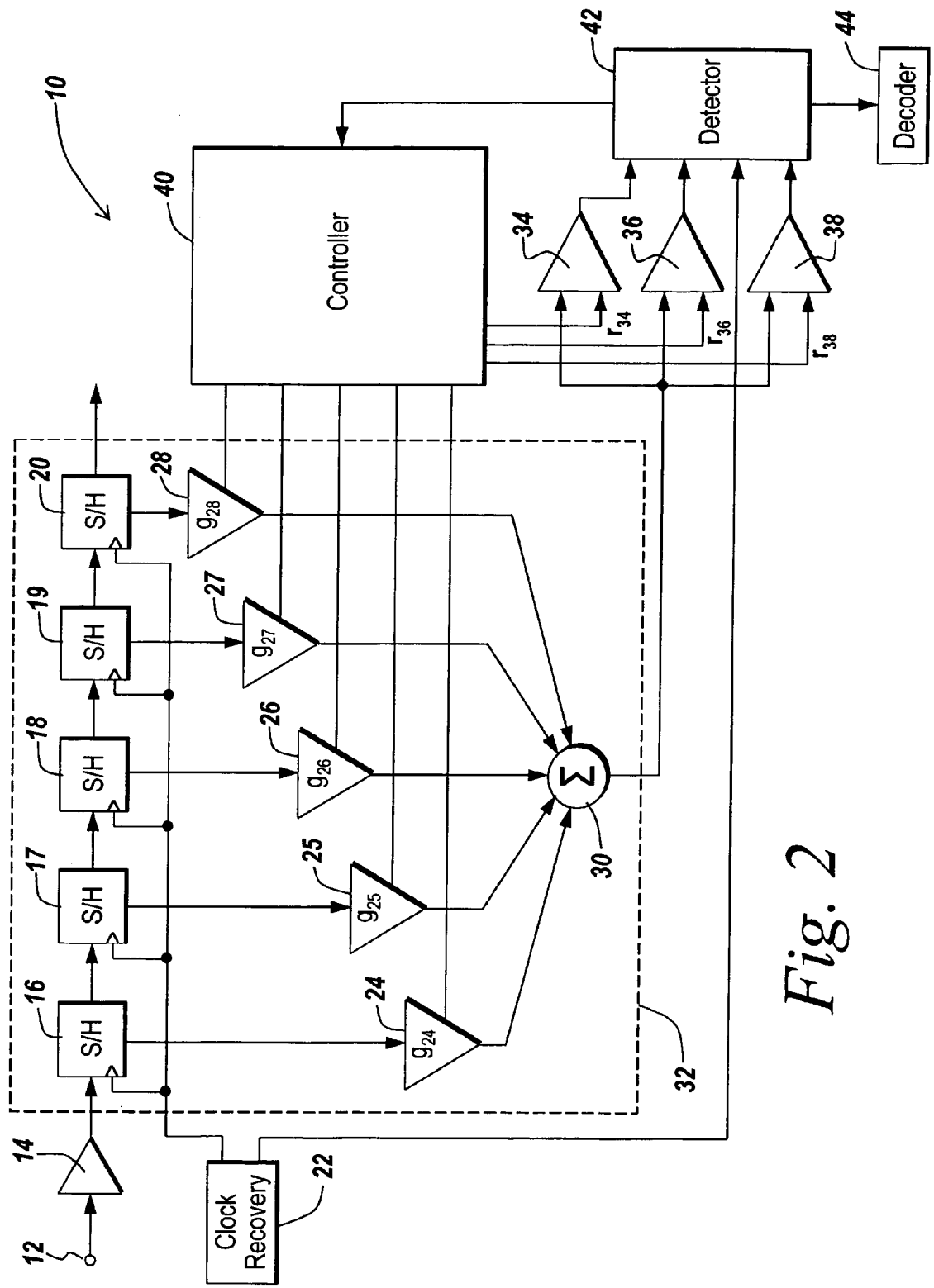
FIG. 2 is a block schematic diagram of a receiver in accordance with an aspect of the present invention.

FIG. 2 shows a part of a receiver device 10. In this illustrated embodiment of the invention, the receiver is intended for use in an optical communications system, in which optical signals are transmitted at high data rates, for example of the order of 10 Gb/s. As shown in FIG. 2, an input 12 receives an analog electrical signal, which has been obtained from the received optical signal, by means of a conventional opto-electronic device (not shown). The analog electrical signal will be a distorted version of the transmitted waveform, which contained a sequence of binary values. The function of the receiver device is then to recover the original sequence as accurately as possible.

The analog electrical signal is passed to an amplifier 14, and the resulting amplified signal is passed to a block of sample-and-hold circuits 16, 17, 18, 19, 20. The sample-and-hold circuits 16–20 are clocked by a clock signal, which is obtained by a clock recovery circuit 22. For the purposes of describing the present invention, the clock recovery circuit may operate in a conventional way, and the operation thereof will not be described further herein. The purpose of the clock recovery circuit 22 is to provide a clock signal at the same frequency as the transmitted waveform, such that the sample-and-hold circuits 16–20 sample the received electrical signal at points which maximise the accuracy with which the original sequence can be recovered. For example, the sample-and-hold circuits 16–20 may sample the received electrical signal at points which correspond to the centres of the bits in the transmitted sequence.

At each clock pulse, the sample-and-hold circuit 16 samples the signal received from the amplifier 14, and the previous sample is passed to the sample-and-hold circuit 17. Meanwhile, the previous sample in the sample-and-hold circuit 17 is passed to the sample-and-hold circuit 18, and so on down the line.

During each clock period of the clock signal from the clock recovery circuit 22, each stored sample in one of the sample-and-hold circuits 16–20 is also passed to a respective amplifier from a block of amplifiers 24, 25, 26, 27, 28. The amplifiers 24–28 multiply their respective input signals by respective gain values $g_{24}$, $g_{25}$, $g_{26}$, $g_{27}$, $g_{28}$. The gain values $g_{24}$–$g_{28}$ are adjustable, on the basis of control signals, which will be described in more detail below. The outputs of the amplifiers 24–28 are then passed to an adder 30, which forms their sum.

Together, the sample-and-hold circuits 16–20, the amplifiers 24–28, and the adder 30 form a conventional FIR filter equalizer 32. By appropriate adjustment of the gain values $g_{24}$–$g_{28}$, the equalizer can be made to modify the received input signal such that the output from the adder 30 has the best eye opening properties. That is, the equalizer 32 compensates at least to some extent for the distortion introduced by the communications medium, in this case the optical fibre.

The equalizer output is supplied as an input to three comparators 34, 36, 38, each of which also receives a respective reference input $r_{34}$, $r_{36}$, $r_{38}$ from a controller 40. The centre reference input $r_{36}$, is set between the levels expected for a binary "1" and a binary "0" in the received signal waveform. Then, if the equalizer output is greater than the centre reference input $r_{36}$, it is determined that the corresponding transmitted bit was more likely to have been a binary "1", while, if the equalizer output is less than the centre reference input $r_{36}$, it is determined that the corresponding transmitted bit was more likely to have been a binary "0". The comparator 36 therefore enables a polarity decision regarding the received bit.

The reference input $r_{34}$ is a high reference, and the reference input $r_{38}$ is a low reference. The values of the high reference $r_{34}$ and the low reference $r_{38}$ are adapted such that a predetermined, small, percentage, for example 10%, of samples lie between the high reference $r_{34}$ and the low reference $r_{38}$.

The outputs from the comparators 34, 36, 38 are supplied to a detector 42. The detector 42 receives the clock signal from the clock recovery circuit 22, which was described previously, such that, at an appropriate time point, once in each bit period, the detector makes output decisions based on the comparator outputs at that time. As mentioned above, a polarity decision is made, based on the output from the comparator 36. Also, a confidence decision may be made, based on the outputs from the comparators 34, 38. That is, for bits which lie between the high reference $r_{34}$ and the low reference $r_{38}$, the polarity decision is made with low confidence, while, for bits which are higher than the high reference $r_{34}$ or lower than the low reference $r_{38}$, the polarity decision is made with high confidence.

For each received bit, the detector 42 can therefore provide a two-bit output, representing the polarity decision, and a confidence bit which indicates whether the polarity decision is made with high or low confidence.

The output from the detector 42 is supplied to a decoder 44, which uses these outputs to adapt the values of the low reference $r_{38}$ and the high reference $r_{34}$, and also uses the outputs in an error correction algorithm to further improve the estimate of the originally transmitted waveform.

As mentioned above, the gain values $g_{24}$, $g_{25}$, $g_{26}$, $g_{27}$, $g_{28}$ of the amplifiers 24, 25, 26, 27, 28 are adjustable, specifically on the basis of control signals supplied by the controller 40. Although, as illustrated, all of the gain values $g_{24}$, $g_{25}$, $g_{26}$, $g_{27}$, $g_{28}$ are adjustable, an alternative embodiment is possible, in which the gain value $g_{26}$ is fixed, for example at 1, and the other gain values $g_{24}$, $g_{25}$, $g_{27}$, $g_{28}$ are adjustable relative to that.

It was further mentioned above that the values of the high reference $r_{34}$ and the low reference $r_{38}$ are adapted such that a predetermined, small, percentage, for example 10%, of bits lie between the high reference $r_{34}$ and the low reference $r_{38}$. Again, an equivalent alternative embodiment is possible, in which the values of the high reference $r_{34}$ and the low reference $r_{38}$ are kept constant, but the gain values $g_{24}$, $g_{25}$, $g_{26}$, $g_{27}$, $g_{28}$ are all adjusted such that the same percentage of bits lie between the high reference $r_{34}$ and the low reference $r_{38}$.

The adjustment of the gain values and of the threshold values is carried out on the basis of algorithms, which are performed simultaneously in the controller 40. The controller 40 then automatically adapts the gain values $g_{24}$, $g_{25}$, $g_{26}$, $g_{27}$, $g_{28}$, which form equalizer coefficients, and the threshold values.

Specifically, the controller 40 adapts the outer threshold values such that a constant proportion of equalizer output samples lie between the outer threshold values, and it acts to adjust the gain values $g_{24}$, $g_{25}$, $g_{26}$, $g_{27}$, $g_{28}$ of the amplifiers 24, 25, 26, 27, 28, in order to maximise the eye opening of the equalizer output signal.

More specifically, in this preferred embodiment of the invention, the value of the high reference $r_{34}$ is adapted such that, for example, 45% of equalizer output samples lie above that value, and the low reference $r_{38}$ is adapted such that, for example, 45% of equalizer output samples lie below that value, so that the remaining 10% of bits lie between the high reference $r_{34}$ and the low reference $r_{38}$. These proportions may be programmed together, or independently.

In addition, the value of the centre threshold $r_{36}$ is adapted. For example, the centre threshold $r_{36}$ may be adapted to be exactly midway between the high reference $r_{34}$ and the low reference $r_{38}$.

The adaptation of the equalizer gain values is carried out by means of a voting procedure. The algorithm uses only the outputs from the three comparators 34, 36, 38. Adjustments are made, which take into consideration only those samples that fall between the two outer thresholds. The adjustments then tend to increase the sample amplitudes of those samples.

The method follows from an assumption that the polarities of the previous and subsequent transmitted symbols mostly match the corresponding outputs from the centre comparator (the output polarity bits).

For each output sample that falls between the outer thresholds, if the polarity is positive (that is, the sample value is higher than the centre threshold), one vote is recorded to adjust the gain values such that each tap would have contributed more positively to the absolute value of the output, given the symbol polarities of the previous and subsequent symbols. If the polarity is negative (that is, the sample value is lower than the centre threshold), one vote is recorded to adjust the gain values such that tap would have contributed more negatively to the absolute value of the output, given the symbol polarities of the previous and subsequent symbols.

Many such votes are applied to a smoothing algorithm to determine the sizes and rate of the actual gain value adjustments.

Put another way, for each sample, S, that falls between the outer thresholds, and for each of the outer amplifiers 24, 25, 27, 28:

If the polarity of S is same as the polarity of the previous or subsequent sample being supplied to that amplifier from the respective sample-and-hold circuit:
vote to increase (in an absolute sense) the amplifier gain value (that is, make a positive gain value larger, or make a negative gain value less negative)
otherwise:
vote to decrease (in an absolute sense) the amplifier gain value (that is, make a positive gain value smaller, or make a negative gain value more negative).

Many such votes are then counted to determine whether, and by how much, to adjust the amplifier gain values.

Figure 3:
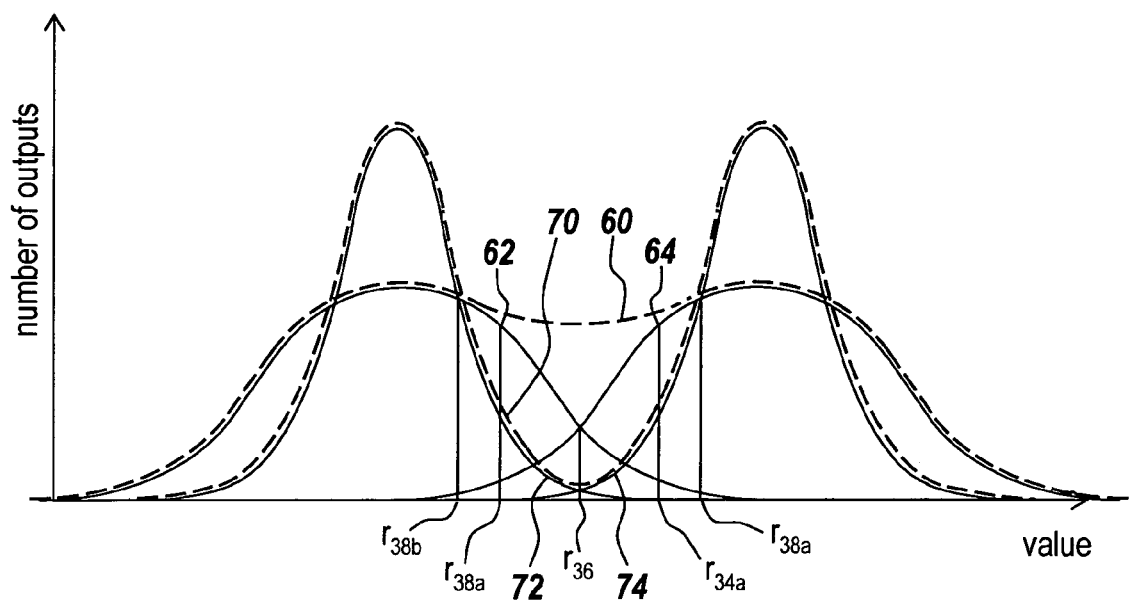
FIG. 3 shows the distribution of equalizer output signal values in the receiver of FIG. 2.

FIG. 3 shows the distribution of values of the outputs from the equalizer 30, before the equalizer coefficients have been optimized, and after the equalizer coefficients have been optimized by means of the algorithm described herein. In each case, for output values on the horizontal axis, the number of equalizer outputs having those particular values is represented on the vertical axis. It can be seen that the overall pre-optimization distribution 60 has two distinct peaks, and is made up of two distributions 62, 64, the distribution 62 representing the equalizer outputs resulting from transmitted binary 0s, and the distribution 64 representing the equalizer outputs resulting from transmitted binary 1s. In the absence of distortion and noise, the two distributions 62, 64 would not overlap at all, but the presence of distortion and noise means that there is a significant region of overlap between them.

It can be seen that the centre reference $r_{36}$ is set such that equalizer outputs which are below the centre reference $r_{36}$ are more likely to have come from distribution 62, and hence to represent a transmitted binary "0", while equalizer outputs which are above the centre reference $r_{36}$ are more likely to have come from distribution 64, and hence to represent a transmitted binary "1". The reference input $r_{34a}$ and the reference input $r_{38a}$ are set such that a known proportion of equalizer outputs lie between these thresholds. For equalizer outputs lying between the high reference $r_{34}$ and the low reference $r_{38}$, there is a significantly larger uncertainty as to whether the equalizer output represents a transmitted binary "0" or "1".

As described above, the controller 40 acts to automatically adapt the equalizer 32 by adjusting the gain values $g_{24}$, $g_{25}$, $g_{26}$, $g_{27}$, $g_{28}$ of the amplifiers 24, 25, 26, 27, 28, in order to maximise the magnitudes of those equalizer outputs which lie between the high reference $r_{34}$ and the low reference $r_{38}$. That is, for equalizer outputs which lie between the high reference $r_{34}$ and the low reference $r_{38}$, the controller 40 acts to maximise the separation of such values from the centre reference $r_{36}$.

FIG. 3 also shows the overall post-optimization distribution 70, again having two distinct peaks, and being made up of two distributions 72, 74, with the distribution 72 representing the equalizer outputs resulting from transmitted binary 0s, and the distribution 74 representing the equalizer outputs resulting from transmitted binary 1s.

Again, the reference input $r_{34b}$ and the reference input $r_{38b}$ are set such that the same known proportion of equalizer outputs lie between these thresholds. However, it can be seen that the optimisation of the equalizer has had the effect that the peaks in the distributions 72, 74 are more pronounced than the peaks outputs in the distributions 62, 64, and that the high and low references have been moved further apart.

Thus, an improvement in the eye opening has been achieved.

Figure 4:
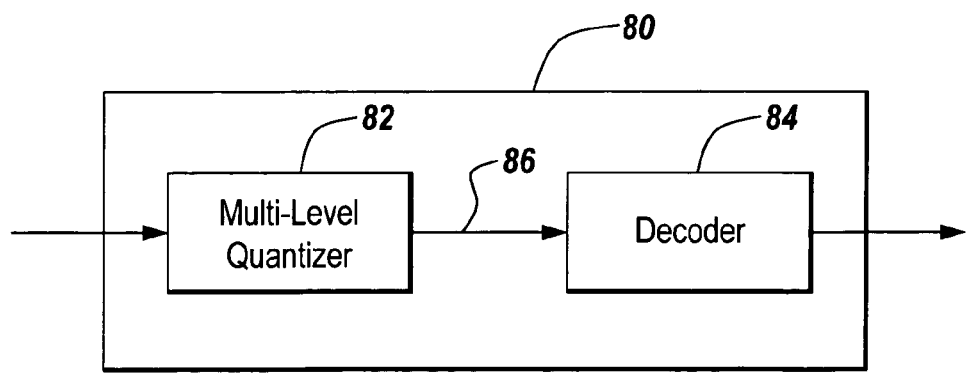
FIG. 4 is a block schematic diagram of a receiver in accordance with another aspect of the present invention.

FIG. 4 shows a form of receiver in which the equalizer may be used

The receiver 80 includes a multi-level quantizer 82, and a decoder 84, which are in the form of respective integrated circuits, and are connected by means of a copper trace 86.

A first equalizer, as described above, is included within the multi-level quantizer 82, in order to compensate at least partially for distortion in the receiver input signal, and in order to provide two-bit outputs representing polarity and confidence information about each bit in the receiver input signal.

The polarity and confidence information is transmitted from the multi-level quantizer 82 to the decoder 84, by means of the copper trace 86. Specifically, the polarity and confidence information is transmitted by means of multi-level signalling. That is, high confidence bits may be represented by relatively large amplitude transmitted pulses, with low confidence bits represented by relatively small amplitude transmitted pulses.

A second equalizer, as described above, is provided within the decoder 84. Since the second equalizer can be pre-programmed with the known proportion of pulses which are to represent low confidence bits, the same adaptation algorithm, described above, can be used in the second equalizer, in order to ensure that the signals used in the decoder represent as closely as possible the signals transmitted from the quantizer.

As illustrated herein, the equalizer 30 is a FIR filter equalizer, operating on analog signals, with the equalizer output being sampled once in each bit period. Alternatively, for the purposes of equalizer adaptation, samples may be taken in a representative selection of bit periods.

As a further alternative, the equalizer may operate on digital signals, with the analog received signal being sampled before equalization. In that case, the equalizer takes the form of a conventional digital FIR filter, with the sample-and-hold circuits 16–20 replaced by registers in a tapped delay line, and the gain elements 24–28 replaced by digital multipliers providing tap weights.

As a still further alternative, the equalizer may be in the form of a decision feedback equalizer, the structure of which is generally known.

Although the receiver has been illustrated herein as a hardware device, it will be appreciated by the person skilled in the art that the equalization and control processes may be carried out in hardware, or in software, or in any combination thereof. Moreover, the equalization and control processes may be carried out either in the analog or digital domain.

The invention claimed is:

1. A method of equalizing a received signal, the method comprising:
applying the received signal to an equalizer, the equalizer having equalizer coefficients, to obtain an equalizer output;
comparing the equalizer output with a centre threshold, and with at least one of a pair of outer thresholds; and adapting the values of the outer thresholds such that a fixed proportion of equalizer output values lie between the pair of outer thresholds, and adapting the equalizer coefficients on the basis of equalizer output values which lie between the pair of outer thresholds, such that the separation of those equalizer output values from the centre threshold tends to be maximized.

2. A method as claimed in claim 1, wherein a first outer threshold is adapted such that a first proportion of equalizer output values lies above the first outer threshold, and a second outer threshold is adapted such that a second proportion of equalizer output values lies above the second outer threshold.

3. A method as claimed in claim 2, wherein the first proportion of equalizer output values lying above the first outer threshold is equal to a third proportion of equalizer output values lying below the second outer threshold.

4. A method as claimed in claim 1, wherein the centre threshold is adapted such that it lies midway between the outer thresholds.

5. A method as claimed in claim 1, wherein, for equalizer output values that lie between the outer thresholds, the equalizer coefficients tend to be adjusted in order to increase the separation of those equalizer output values from the centre threshold.

6. A method as claimed in claim 5, comprising a voting algorithm wherein, if an equalizer output value is higher than the centre threshold, one vote is recorded in respect of each equalizer coefficient to adjust that equalizer coefficient such that it would have contributed more positively to the absolute value of the output, given the symbol polarities of the previous and subsequent symbols, and wherein, if an equalizer output value is lower than the centre threshold, one vote is recorded in respect of each equalizer coefficient to adjust that equalizer coefficient such that it would have contributed more negatively to the absolute value of the output, given the symbol polarities of the previous and subsequent symbols, and wherein the equalizer coefficients are adjusted on the basis of the recorded votes.

7. An equalizer, having equalizer coefficients, the equalizer comprising:
   comparators for comparing an equalizer output with a centre threshold, and with at least one of a pair of outer thresholds; and
   a controller, for adapting the values of the outer thresholds such that a fixed proportion of equalizer output values lie between the pair of outer thresholds, and for adapting the equalizer coefficients on the basis of equalizer output values which lie between the pair of outer thresholds, such that the separation of those equalizer output values from the centre threshold tends to be maximized.

8. An equalizer as claimed in claim 7, wherein the controller adapts the first outer threshold such that a first proportion of equalizer output values lies above the first outer threshold, and a second outer threshold is adapted such that a second proportion of equalizer output values lies above the second outer threshold.

9. An equalizer as claimed in claim 8, wherein the first proportion of equalizer output values lying above the first outer threshold is equal to a third proportion of equalizer output values lying below the second outer threshold.

10. An equalizer as claimed in claim 7, wherein the controller adapts the centre threshold such that it lies midway between the outer thresholds.

11. An equalizer as claimed in claim 7, wherein, for equalizer output values that lie between the outer thresholds, the controller tends to adapt the equalizer coefficients in order to increase the separation of those equalizer output values from the centre threshold.

12. An equalizer as claimed in claim 11, wherein the controller is suitable for performing a voting algorithm wherein, if an equalizer output value is higher than the centre threshold, one vote is recorded in respect of each equalizer coefficient to adjust that equalizer coefficient such that it would have contributed more positively to the absolute value of the output, given the symbol polarities of the previous and subsequent symbols, and wherein, if an equalizer output value is lower than the centre threshold, one vote is recorded in respect of each equalizer coefficient to adjust that equalizer coefficient such that it would have contributed more negatively to the absolute value of the output, given the symbol polarities of the previous and subsequent symbols, and to adapt the equalizer coefficients on the basis of the recorded votes.

13. A receiver, comprising an equalizer, the equalizer having equalizer coefficients and comprising:
   comparators for comparing an equalizer output with a centre threshold, and with at least one of a pair of outer thresholds; and
   a controller, for adapting the values of the outer thresholds such that a fixed proportion of equalizer output values lie between the pair of outer thresholds, and for adapting the equalizer coefficients on the basis of equalizer output values which lie between the pair of outer thresholds, such that the separation of those equalizer output values from the centre threshold tends to be maximized.

* * * * *